United States Patent

Yoshida et al.

[11] Patent Number: 5,855,926
[45] Date of Patent: Jan. 5, 1999

[54] METHOD FOR EXTRUSION-MOLDING LAMINATED PARISON AND APPARATUS FOR THE SAME

[75] Inventors: Toshiji Yoshida; Toshio Kagitani; Sohei Masaki, all of Yokohama, Japan

[73] Assignee: The Japan Steel Works, Ltd., Tokyo, Japan

[21] Appl. No.: 956,400

[22] Filed: Oct. 23, 1997

[30] Foreign Application Priority Data

Oct. 25, 1996 [JP] Japan .................................... 8-284229
Oct. 25, 1996 [JP] Japan .................................... 8-284230

[51] Int. Cl.[6] ............................ B29C 47/04; B29C 47/26
[52] U.S. Cl. .................................... 425/133.1; 425/133.1; 425/462; 425/467; 264/515
[58] Field of Search ............................... 425/131.1, 133.1, 425/380, 462, 467; 264/171.27, 515

[56] References Cited

U.S. PATENT DOCUMENTS

| 4,047,868 | 9/1977 | Kudo et al. ........................... 425/133.1 |
| 4,522,775 | 6/1985 | Briggs et al. ......................... 425/133.1 |
| 4,838,778 | 6/1989 | Becker et al. ........................ 425/133.1 |
| 5,156,857 | 10/1992 | Wang et al. .......................... 425/133.1 |
| 5,297,946 | 3/1994 | Yoshida et al. ......................... 425/132 |
| 5,667,748 | 9/1997 | Ohta et al. ............................ 425/133.1 |

FOREIGN PATENT DOCUMENTS 9-99475   4/1997   Japan .

*Primary Examiner*—Khanh P. Nguyen
*Attorney, Agent, or Firm*—Oblon, Spivak, McClelland, Maier & Neustadt, P.C.

[57] ABSTRACT

The present invention provides a laminated-parison extrusion-molding apparatus which includes a head body; a multi-ring structure having a spider provided in the head body; a head core provided inside the multi-ring structure; an outer cylinder member provided surrounding a lower outer periphery of the multi-ring structure, the outer cylinder member constituting a lower portion of the head body; and an annular member provided inside the outer cylinder member, wherein an outer main material is supplied to a flow passage provided between the outer cylinder member and the annular member so as to achieve an outer main material layer having a uniform thickness.

5 Claims, 7 Drawing Sheets

METHOD FOR EXTRUSION-MOLDING LAMINATED PARISON AND APPARATUS FOR THE SAME

BACKGROUND OF THE INVENTION

1. Field of the Invention

The present invention relates to a method for extrusion-molding a laminated parison and an apparatus for the same. More specifically, the present invention relates to a method for extrusion-molding a laminated parison and an apparatus for the same, which is used for molding a vessel possessing highly effective barrier properties to gasohol containing alcohol, for example, a plastic automotive fuel tank.

2. Description of the Related Art

As disclosed in Japanese Patent Application Laid-open No. 99475/97, the applicant has previously proposed a method of and an apparatus for extrusion-molding a laminated parison which have the following arrangement and function. That is, FIG. 1 shows a whole schematic arrangement of the prior art apparatus for extrusion-molding the laminated parison. FIG. 2 is a cross sectional view of a multi-ring structure shown in FIG. 1.

In FIG. 1, reference numeral 1 denotes a die head having an approximately cylindrical shape as a whole. A head core 4 is provided in a head body 2 of the die head 1. An annular multi-ring structure 12 is provided therebetween. A cylindrical inner main material flow passage 47 is provided on the head core 4 side of the multi-ring structure 12. An outer main material flow passage 48 is provided on the head body 2 side thereof. These main material flow passages 47 and 48 are communicated with to a main material extruder 41 provided on an upper portion of an outer wall of the die head 1.

The main material flow passages 47 and 48 are communicated with an extrusion nozzle 30 formed by die outer and inner cylinders 28 and 29, respectively, mounted on lower portions of the head body 2 and the head core 4. The inner cylinder 29 is moved upwardly and downwardly through a vertical rod 31, and thereby a nozzle gap of the extrusion nozzle 30, that is, a wall thickness of the laminated parison can be freely adjusted.

As shown in FIGS. 1 and 2, the multi-ring structure 12 comprises first, second and third spider rings 50, 51 and 52 forming a spider 49, and a cap ring 53. First, second, third and fourth annular nozzles 16, 17, 18 and 46 are concentrically provided in the spider rings 50, 51, 52 and the cap ring 53.

The first and third annular nozzles 16 and 18 are communicated with an adhesive material extruder 19. The second annular nozzle 17 is also communicated with a barrier material extruder 20 which is for extruding a barrier material made of well-known ethylene-vinyl-alcohol copolymer resin (abbreviated EVOH) which possesses barrier properties to gasohol containing alcohol. The main material flow passages 47, 48 and the annular nozzles 16, 17, 18, 46 are concentrically arranged in the die head 1.

The fourth annular nozzle 46 is communicated with a groove 6*b* formed between the cap ring 53 and the first spider ring 50. The fourth annular nozzle 46 is formed so that it may be situated to face the inside of the outer main material flow passage 48. The groove 6*b* is communicated with, through a flow passage 6*a*, a reclaimed material extruder 6 which is for extruding a reclaimed material so as to make it lamina-shaped, which is obtained by crushing burrs reclaimed from molded products.

An operation will be described below. In the first place, the extruders 41, 19, 20 and 6 are driven by respective drivers (well-known hydraulic cylinders or rotating apparatus) 42, 43, 44 and 45. By the thus driven extruders, inner and outer main materials A and F, first and second adhesive materials B and D, a barrier material C and a reclaimed material E are intermittently or continuously extruded and supplied into the inner and outer main material flow passages 47 and 48 and into the annular nozzles 16, 18, 17 and 46, respectively. A four-different-material six-layered laminated parison 32 is thus obtained from the extrusion nozzle 30. The parison 32 has a wall structure consisting of six layers: innermost and outermost layers of the inner and outer main materials A and F, respectively; a core layer of the barrier material C which is a core material; a pair of first and second adhesive material layers B and D, respectively, the first adhesive material layer B being situated between the inner main material layer A and the barrier material layer C, the second adhesive material layer D being situated between the outer main material layer F and the barrier material layer C; and a layer of the reclaimed material E situated between the outer main material layer F and the second adhesive material layer D.

By performing blow molding for the laminated parison 32 by means of a blow molding apparatus not shown, a container, e.g. a gasoline tank, having a four-different-material six-layered wall structure can be molded, which includes the core layer of the barrier material which exhibits barrier properties to methanol, ethanol or the like. A container will advantageously be achieved, which includes the highly effective barrier material, for example, ethylene-vinyl-alcohol copolymer resin or EVOH and was heretofore impossible to achieve.

The aforementioned method for extrusion-molding the laminated parison and the apparatus for the same has the following problems caused by the above-described arrangement. That is, as shown in FIG. 3, the thickness of the outer main material layer becomes non-uniform in a spider portion G in a circumferential section of the laminated parison 32. Furthermore, the outer and inner main materials F and A are supplied from a single extruder and separated by the multi-ring structure, and thus the laminar thickness cannot be independently controlled.

Moreover, when the extruders are continuously driven so as to continuously extrude the four-different-material six-layered laminated parison 32 from the extrusion nozzle 30 of the die head 1, as shown in FIG. 4, an intermediate material layer I is sometimes waved in a circumferential shape, where the intermediate material layer I consists of the barrier material C and the first and second adhesive materials B and D formed inside and outside the barrier material layer C, respectively.

SUMMARY OF THE INVENTION

It is an object of the present invention to provide a method for extrusion-molding a laminated parison and an apparatus for the same, which has highly effective barrier properties to gasohol containing alcohol, has an outer main material layer in uniform thickness and has the thickness of outer and inner main material layers arbitrarily controlled.

It is another object of the present invention to provide a method for extrusion-molding a laminated parison and an apparatus for the same, which can eliminate a waviness of an intermediate material layer consisting of a barrier material and first and second adhesive materials formed inside and outside the barrier material layer.

It is a still another object of the present invention to provide a method of and an apparatus for extrusion-molding a laminated parison which can achieve, without an enlargement of a die head, a four-different-material six-layered parison which has highly effective barrier properties and has a layer of a reclaimed material and a highly effective barrier material (ethylene-vinyl-alcohol copolymer resin or EVOH).

In order to achieve the above-described objects, according to the present invention, there is provided a method of extrusion-molding a laminated parison which comprises the steps of:

supplying an inner main material to an inside of a multi-ring structure having a spider provided inside a head body;

supplying a reclaimed material to an outside of the multi-ring structure;

supplying an intermediate material to the multi-ring structure;

supplying an outer main material from the outside to a lower portion of the spider; and forming the laminated parison by joining the materials at a joint section.

Preferably, a flow rate of an inner main material layer made of the inner main material and a flow rate of an outer main material layer made of the reclaimed material and the outer main material, each is at least twice higher than the flow rate of an intermediate material layer of the intermediate material at the joint section.

In an apparatus for implementing the laminated-parison extrusion-molding method described above, the apparatus comprises:

a head body;

a multi-ring structure having a spider provided inside the head body; and a head core provided inside the multi-ring structure, wherein an outer cylinder member is provided surrounding a lower outer periphery of the multi-ring structure and constitutes a lower portion of the head body, and an annular member is provided inside the outer cylinder member, so that the outer main material is supplied to the flow passage provided between the outer cylinder member and the annular member.

The above and other objects, features and advantages of the present invention will become apparent from the following description based on the accompanying drawings which illustrate examples of preferred embodiments of the present invention.

DETAILED DESCRIPTION OF THE PREFERRED EMBODIMENTS

Figure 1:
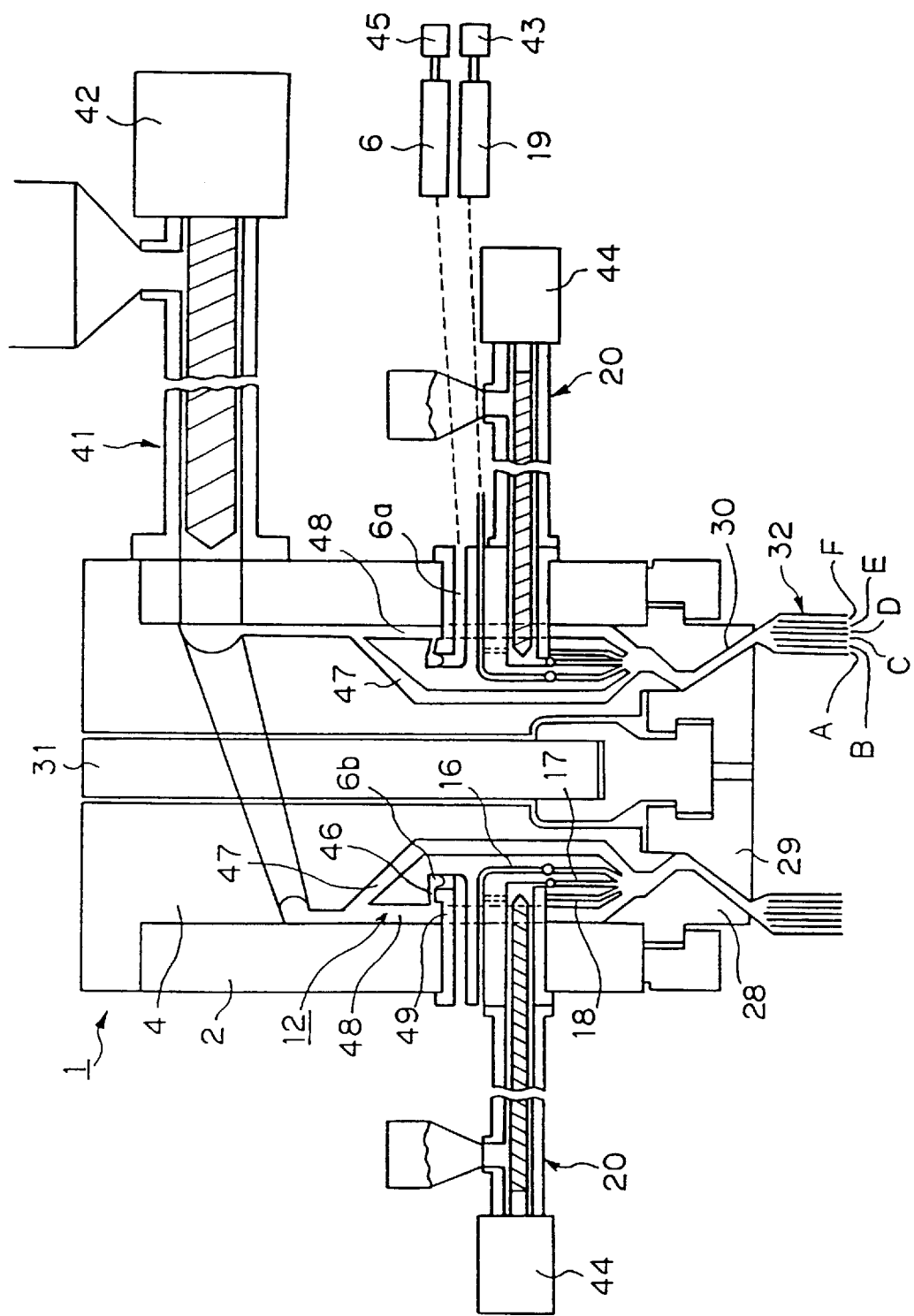
FIG. 1 is a sectional view showing a prior art laminated-parison extrusion-molding apparatus.

Embodiments of the present invention will be described with reference to the accompanying drawings. It should be noted that the parts or elements having identical or similar counterparts in the prior art are designated by identical reference numerals.

Figure 5:
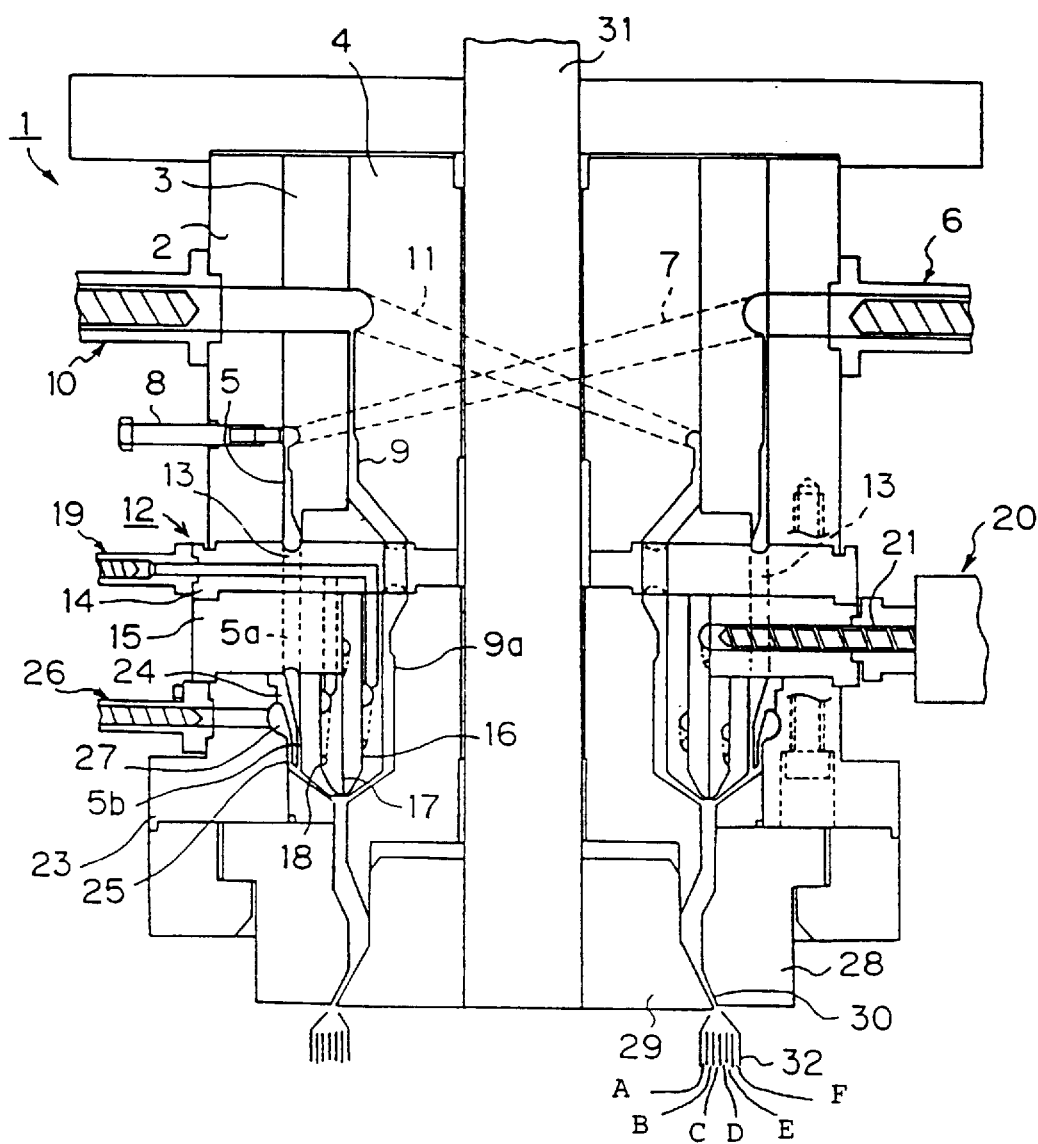
FIG. 5 is a sectional view showing a laminated-parison extrusion-molding apparatus according to the present invention.

In FIG. 5, reference numeral 1 denotes a die head having an approximately cylindrical shape. A cylindrical member 3 is fittingly inserted in a head body 2 of the die head 1. A head core 4 is fittingly inserted in the cylindrical member 3.

A cylindrical reclaimed material flow passage 5 is provided between the head body 2 and the cylindrical member 3. The reclaimed material flow passage 5 is communicated with, through a manifold 7, a reclaimed material extruder 6 connected to an upper portion of an outer wall of the head body 2. A bolt 8 is engaged into an end of the manifold 7 from the outer wall of the head body 2. A removal of the bolt 8 from the end of the manifold 7 allows a reclaimed material to leak, thereby permitting an elimination of weld-mark and impurity.

The reclaimed material extruder 6 extrudes the reclaimed material, which is obtained by crushing burrs or the like from molded products, as a bulk filler of an outer main material.

A cylindrical inner main material flow passage 9 is provided between the cylindrical member 3 and the head core 4. The flow passage 9 is communicated with, through a manifold 11, an inner main material extruder 10 connected to the upper portion of the outer wall of the head body 2.

An annular multi-ring structure 12 is provided in a lower portion of the cylindrical member 3 and the head body 2. A reclaimed material flow passage 5a communicated with the reclaimed material flow passage 5 is provided on the head body 2 side of the multi-ring structure 12. An inner main material flow passage 9a communicated with the inner main material flow passage 9 is also provided on the head core 4 side of the multi-ring structure 12.

The multi-ring structure 12 comprises first and second spider rings 14, 15 which constitute a spider 13. First, second and third annular nozzles 16, 17 and 18 are concentrically formed by the spider rings 14 and 15. The spider 13 is provided in four or more portions in the multi-ring structure 12 so as to fix the multi-ring structure 12 to the head body 2 or the like. Each portion among the spiders 13 constitutes the reclaimed material flow passage 5a.

Figure 6:
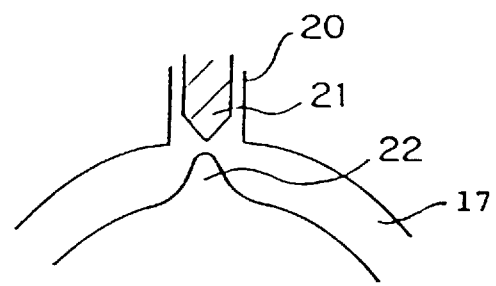
FIG. 6 is an illustration showing a ridge provided in an annular nozzle.

The first and third annular nozzles 16 and 18 are communicated with an adhesive material extruder 19. The second annular nozzle 17 is communicated with a barrier material extruder 20 which is for extruding a barrier material made of well-known ethylene-vinyl-alcohol copolymer resin (EVOH) which possesses barrier properties to gasohol containing alcohol. The annular nozzle 17 is located in front of a screw 21 of the barrier material extruder 20. As shown in FIG. 6, a ridge 22 is formed in the annular nozzle 17. The ridge 22 divides the extruded barrier material into two so that the barrier material can be supplied in uniform, ring and distributed states into the second annular nozzle 17 without residing.

An outer cylinder member 23 is concentrically provided so that it may surround the lower portion of the multi-ring structure 12 and may constitute the lower portion of the head body 2. An annular member 24 is concentrically provided in the outer cylinder member 23.

A reclaimed material flow passage 5b communicated with the reclaimed material flow passage 5a is provided on the multi-ring structure 12 side of the annular member 24. An outer main material flow passage 25 is provided on the outer cylinder member 23 side thereof. The outer main material flow passage 25 is communicated, through a manifold 27, with an outer main material extruder 26 connected to the outer wall of the outer cylinder member 23.

The flow passages 5, 9, 25 and the annular nozzles 16, 17, 18 are concentrically formed in the die head 1.

The screw 21 of the barrier material extruder 20 is inserted into the die head 1, that is, the multi-ring structure 12 so as to make a barrier material flow passage shortest, thereby minimizing residual points of the barrier material. Thus, the barrier material can be supplied directly into the second annular nozzle 17 without causing a thermal decomposition, a burning and a heat deterioration. The screws of the other extruders 6, 10, 19 and 26 can be also inserted in the die head 1 in the same manner as the foregoing extruder 20.

The flow passages are communicated with the extrusion nozzle 30 comprising a die outer cylinder 28 and a die inner cylinder 29, respectively, mounted to the lower portion of the outer cylinder member 23 and the head core 4. The die inner cylinder 29 is moved upwardly and downwardly through a vertical rod 31, whereby a nozzle gap of the extrusion nozzle 30 can be freely adjusted so that a wall thickness of the laminated parison can be freely adjusted.

Figure 7:
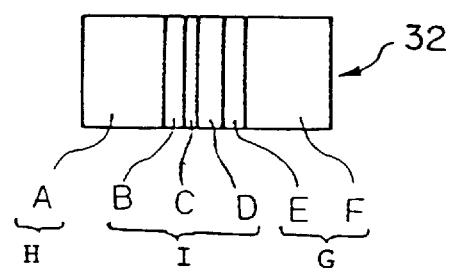
FIG. 7 is a partial sectional view of the laminated parison according to present invention.

An operation will be described below. By means of the extruders 10, 26, 19, 20 and 6, inner and outer main materials A and F, first and second adhesive materials B and D, a barrier material C and a reclaimed material E are intermittently or continuously extruded and supplied into the inner and outer main material flow passages 9 and 25, the annular nozzles 16, 18, 17 and the reclaimed material flow passage 5, respectively. As shown in FIG. 7, a four-different-material six-layered laminated parison 32 is thus obtained from the extrusion nozzle 30. The parison 32 has a wall structure consisting of six layers: an inner main material layer H of an inner main material A; an intermediate material layer I of first and second adhesive materials B, D and a barrier material C; and an outer main material layer G of a reclaimed material E and an outer main material F.

Figure 4:
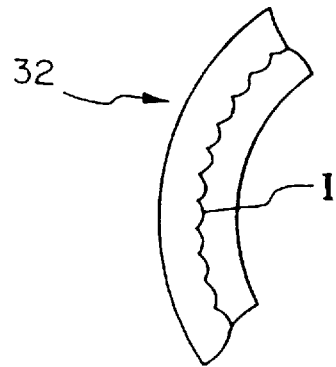
FIG. 4 is a sectional view showing an intermediate material layer of the prior art laminated parison.

When the four-different-material six-layered laminated parison 32 is extruded from the die head 1, the intermediate material layer I is sometimes waved in a circumferential shape, as shown in FIG. 4.

The inventors have been eager to study the waviness of the intermediate material layer I. As a result, it becomes clear that the waviness does not occur when an accumulator or the like having a piston at a tip end of each extruder 6, 10, 19, 20 and 26 is provided so that the laminated parison 32 is intermittently injected from the extrusion nozzle 30, while the waviness occurs only when the laminated parison 32 is continuously extruded.

Figure 8:
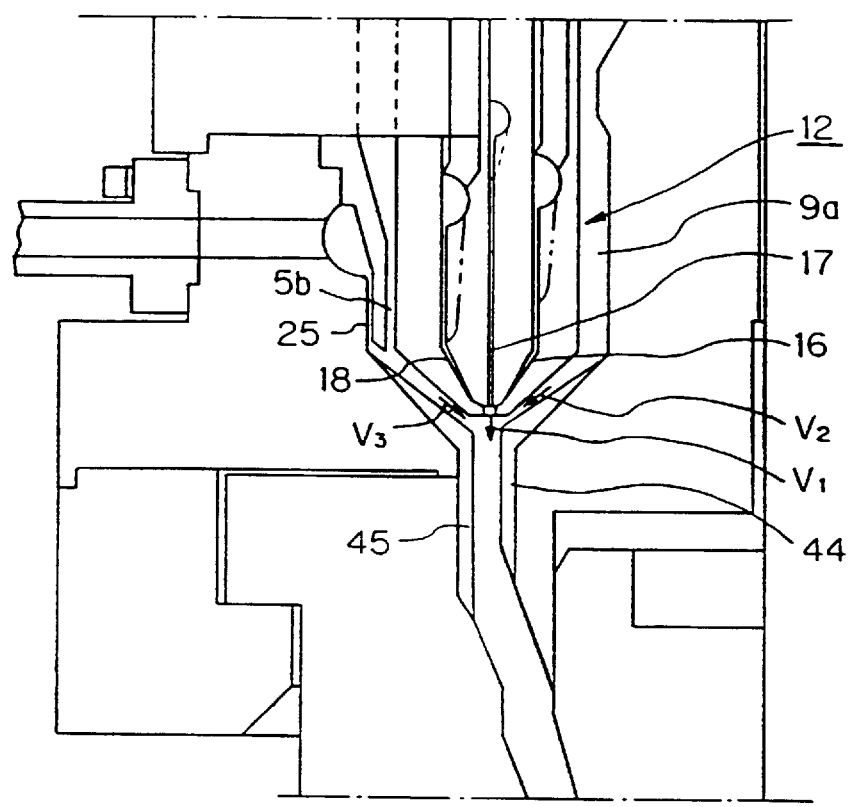
FIG. 8 is an illustration showing a joint section of the intermediate material layer and inner/outer material layers in a joint section.

As shown in FIG. 8, it also becomes clear that the waviness of the intermediate material layer I occurs depending on a relationship between a flow rate V1 on an outlet port side of the intermediate material layer I and flow rates V2, V3 of the inner main material layer H and the outer main material layer G (including a reclaimed material layer) which are to be joined to the flow rate V1. That is, the flow passages are formed so that the flow rate V2, V3 of main material layers H, G, each in a joint section of the main material layers H, G and the intermediate material layer I may be at least twice higher than the flow rate V1 on the outlet port side of the intermediate material layer I. This solves the waviness of the intermediate material layer I, thereby improving a quality of a multi-layer container. An adjustment of the flow passages in the joint section can be accomplished by disposing inner and outer adjusting rings 44, 45 for adjusting the flow rate of the inner main material layer H and the outer main material layer G in the joint section.

By performing blow molding for the laminated parison 32 by means of a blow molding apparatus not shown, a container, e.g. a gasoline tank, having a four-different-material six-layered wall structure can be molded, which includes the core layer of the barrier material which exhibits barrier properties to methanol, ethanol or the like. A container may thus advantageously be achieved which includes the highly effective barrier material (ethylene-vinyl-alcohol copolymer resin or EVOH), heretofore, it was impossible to achieve such a container.

Herein, an example is merely disclosed for the description of a shape or the like of the flow passages extending from the extruders 6, 10, 19, 20 and 26 to the extrusion nozzle 30. Needles to say, a little change could achieve the same effect as described above.

Figure 2:
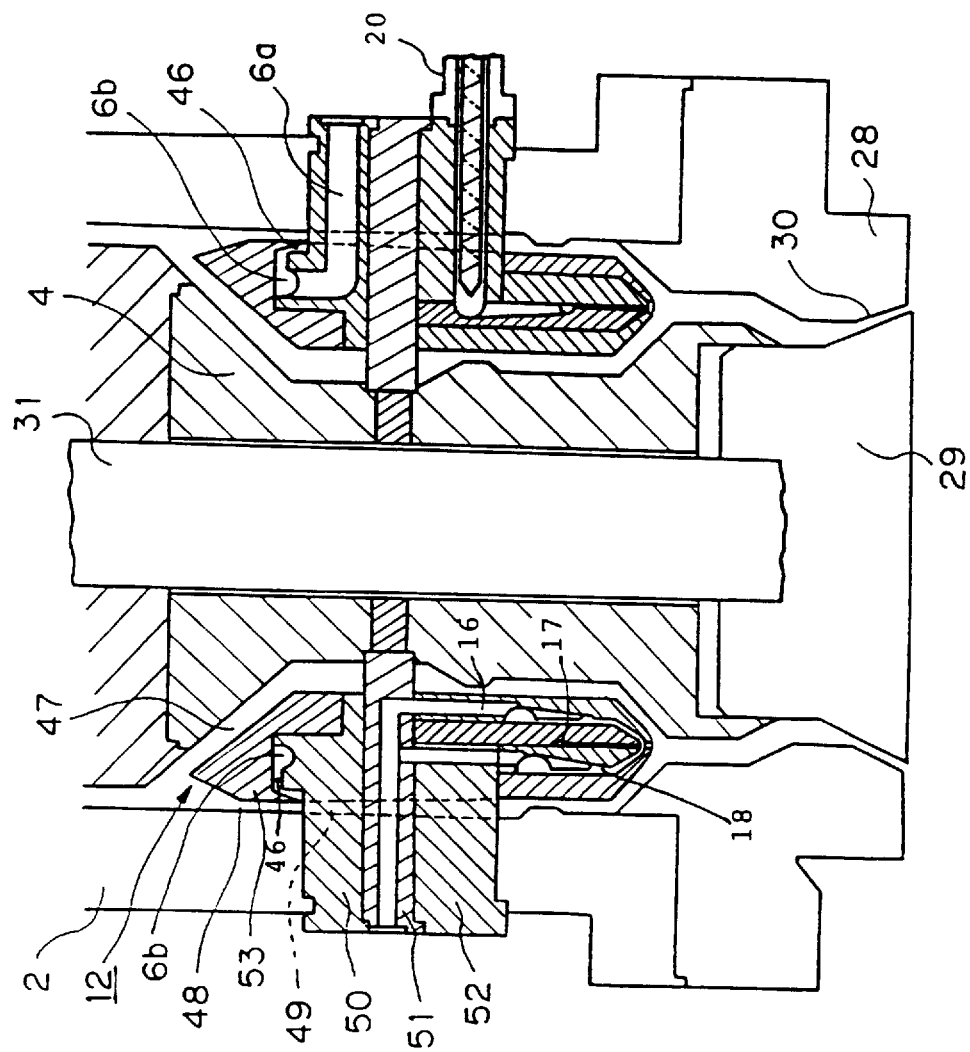
FIG. 2 is a sectional view of a multi-ring structure shown in FIG. 1.
Figure 3:
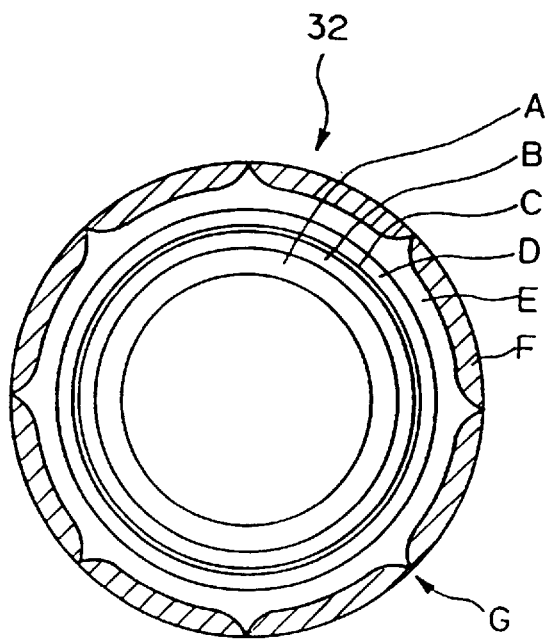
FIG. 3 is a sectional view of a prior art laminated parison.
Figure 9:
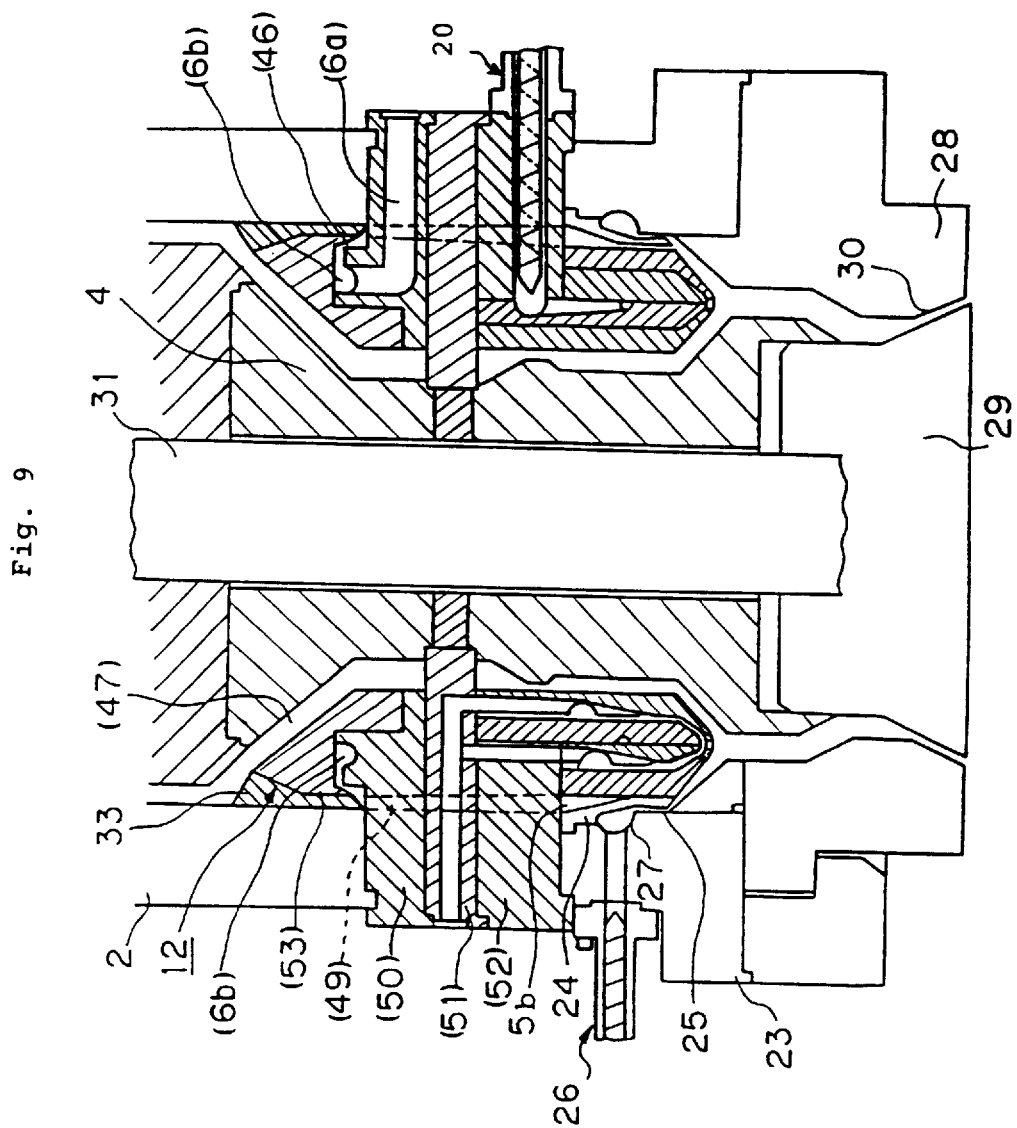
FIG. 9 is a sectional view showing another laminated-parison extrusion-molding apparatus according to the present invention.

As shown in FIG. 9, a closing ring 33 is provided between a cap ring 53 of the multi-ring structure 12 of the conventional die head 1 shown in FIGS. 1 and 2 and the head body 2 so as to arrange an inner main material flow passage 47 alone. The inner main material flow passage 47 is communicated with the inner main material extruder 10 (see FIG. 5) described in the aforementioned embodiment. Furthermore, as shown in FIG. 9, the outer cylinder member 23 is concentrically provided so that it may surround a lower outer periphery of the multi-ring structure 12 and may constitute the lower portion of the head body 2. The annular member 24 is concentrically provided in the outer cylinder member 23 so that the outer main material flow passage 25 is formed. The outer main material flow passage 25 may be communicated with, through the manifold 27, to the outer main material extruder 26 connected to the outer wall of the outer cylinder member 23.

A reclaimed material flow passage 5b communicated with the flow passage 6a is provided on the multi-ring structure 12 side of the annular member 24.

In this case, the cap ring 53 and the closing ring 33 may be integrated with each other.

Although a continuous extrusion is suitable for the aforementioned extrusion of EVOH in respect to a nature of that material, an intermittent extrusion can also achieve EVOH.

Although, in the above-described embodiment, a single extruder for each material is arranged to the die head, the two extruders are arranged opposite to each other when a single extruder causes a non-uniformity of laminar thickness.

It is to be understood, however, that although the characteristics and advantages of the present invention have been set fourth in the foregoing description, the disclosure is illustrative only, and changes may be made in the arrangement of the parts within the scope of the appended claims.

What is claimed is:

1. A laminated-parison extrusion-molding apparatus comprising:
 a head body;
 a multi-ring structure having a spider provided inside said head body;

a head core provided inside said multi-ring structure;

an outer cylinder member provided so as to surround a lower outer periphery of said multi-ring structure, said outer cylinder member constituting a lower portion of said head body;

an annular member provided inside said outer cylinder member;

a flow passage provided inside said multi-ring structure, said flow passage being communicated with an inner main material extruder to form an inner main material layer;

a flow passage provided outside said multi-ring structure, said flow passage being communicated with a reclaimed material extruder to form one part of an outer main material layer;

a plurality of flow passages provided in said multi-ring structure, said plurality of flow passages being communicated with a barrier material extruder and an adhesive material extruder, respectively, and forming an intermediate material layer;

a flow passage provided between said outer cylinder member and said annular member, said flow passage being communicated with an outer main material extruder to form one part of the outer main material layer; and a joint section of said flow passages.

2. The apparatus according to claim 1, wherein the flow rate of said inner main material layer and the flow rate of said outer main material layer are at least twice higher than the flow rate of said intermediate material layer at said joint section.

3. The apparatus according to claim 2, wherein an adjusting ring for adjusting the flow rates of said inner and outer main material layers is provided in said joint section.

4. A laminated-parison extrusion-molding apparatus comprising:

a head body;

a head core provided inside said head body;

a cylindrical member provided between said head body and said head core;

a multi-ring structure having a spider provided in the lower portion of said head body and said cylindrical member;

an outer cylinder member provided surrounding the lower outer periphery of said multi-ring structure, said outer cylinder member constituting the lower portion of said head body;

an annular member provided inside said outer cylinder member;

a flow passage provided between said head body and said cylindrical member, said flow passage being communicated with a reclaimed material extruder through a manifold;

a flow passage provided between said cylindrical member and said head core, said flow passage being communicated with an inner main material extruder through the manifold;

a plurality of flow passages provided in said multi-ring structure, said plurality of flow passages being communicated with a barrier material extruder and an adhesive material extruder, respectively; and a flow passage communicated with an outer main material extruder through the manifold between said outer cylinder member and said cylindrical member.

5. The apparatus according to claim 4, wherein a screw of said barrier material extruder is inserted in said multi-ring structure.

* * * * *